June 23, 1942.   J. H. WIGGINS   2,287,212
SEALS FOR FLOATING ROOFS
Filed April 1, 1939   2 Sheets-Sheet 1

INVENTOR:
JOHN H. WIGGINS
BY
ATTORNEY

June 23, 1942.  J. H. WIGGINS  2,287,212
SEALS FOR FLOATING ROOFS
Filed April 1, 1939  2 Sheets-Sheet 2

INVENTOR:
JOHN H. WIGGINS
BY *Wells R. Church*
ATTORNEY

Patented June 23, 1942

2,287,212

UNITED STATES PATENT OFFICE 2,287,212

SEALS FOR FLOATING ROOFS

John H. Wiggins, Chicago, Ill.

Application April 1, 1939, Serial No. 265,432

1 Claim. (Cl. 220—26)

This invention relates to liquid storage apparatus of the type that consist of a tank for holding the liquid, a vertically-movable roof, that normally floats upon and is sustained by the liquid confined in the tank, and a means mounted on the peripheral portion of said floating roof for closing the space between the roof and the tank wall, so as to protect the contents of the tank from the atmosphere.

The main object of my invention is to provide a liquid storage apparatus of the general type referred to, that is equipped with a novel auxiliary bottom seal which makes it possible to easily remove dirt, sediment, and volatile products that collect on the interior of the tank, on the underside of the roof, and on the sealing means at the peripheral edge of the roof.

Figure 1 of the drawings is a vertical transverse sectional view of a liquid storage apparatus, constructed in accordance with my invention, showing the tank empty.

Figure 1:
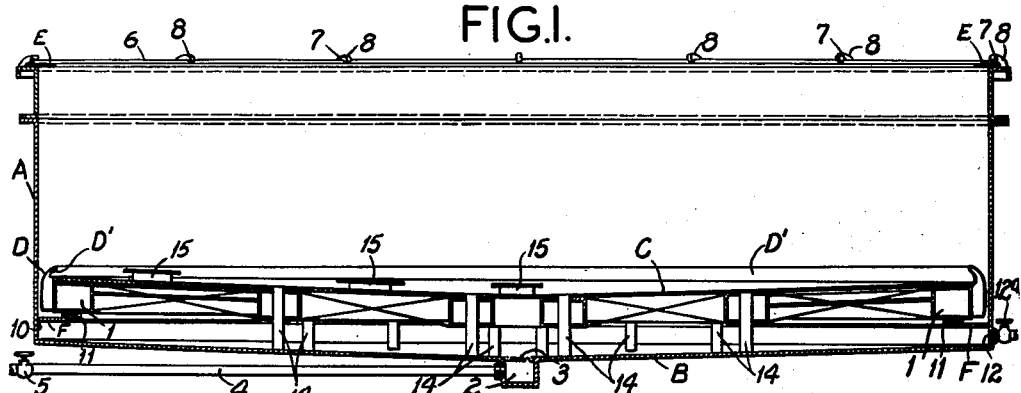
Figure 2:
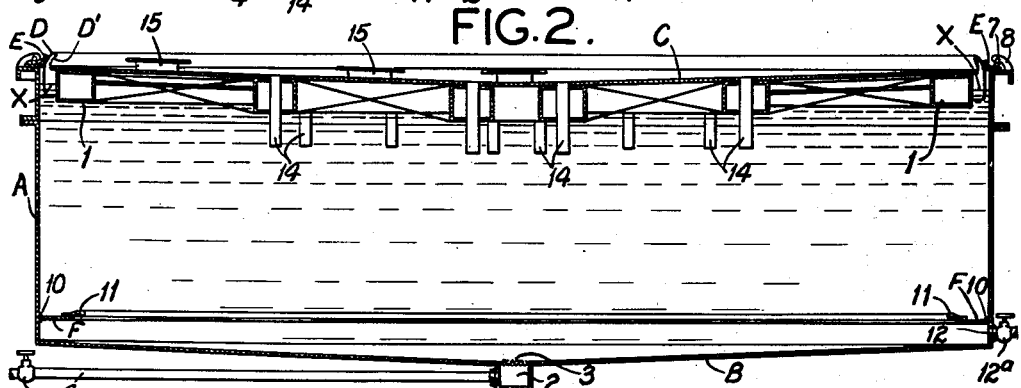
Figure 2 is a similar view, showing the tank full of liquid.

In the drawings, the reference characters A and B designate the side wall and the bottom, respectively, of a large circular metal tank of the kind commonly used for storing crude oil, gasoline and other volatile liquids. The liquid $x$ in said tank is protected from the atmosphere by a floating roof C, which is provided at its peripheral edge with a primary side wall sealing means D, that is in sliding engagement with the side wall A of the tank. The particular construction of the floating roof C and of the primary side wall sealing means D at the peripheral edge of the roof, are immaterial, as my invention contemplates the use of any type or kind of floating roof and any type or kind of means D for maintaining a substantially gas-tight joint between the roof and the side wall of the tank when the roof is floating, or, in other words, when the roof is sustained or supported by the liquid in the tank. The floating roof herein illustrated is of the pontoon type, and is so constructed that a substantially annular-shaped pontoon 1 at the peripheral edge of the roof constitutes a rim which prevents the liquid in the tank from overflowing onto the top side of the roof, said rim 1 being spaced away from the side wall A of the tank, and the top edge of said rim being located in a higher horizontal plane than the surface of the liquid in the annular space between the tank side wall and the rim 1 of the roof. The means previously referred to that is used to maintain a substantially gas-tight joint between the tank side wall and the roof when the roof is floating, is herein illustrated more or less diagrammatically, inasmuch as it is of conventional construction. It comprises a primary side wall seal or shoe D of considerable height or depth, that is in sliding engagement with the tank wall, a supporting means for said seal or shoe D formed usually by hangers (not shown) mounted on the roof, and a closure member D', formed usually by an annular-shaped piece of flexible gas-tight fabric, attached at its outer edge to the side wall seal or shoe D, and attached at its inner edge to the rim 1 on the roof C. When the roof is floating on the liquid in the tank, the relatively deep, narrow slot between the tank side wall and the shoe D, is closed at its lower end by the liquid in the tank, thus preventing gases and volatile products from escaping upwardly through the space between the tank side wall and the shoe D.

The bottom B of the tank slopes downwardly from the side wall of the tank to the center of said bottom, where a sump 2 is located, the upper end of said sump being protected by a screen 3. A drain pipe or draw-off pipe 4, that leads laterally from the sump 2, is equipped with a valve 5 that is normally closed. In the operation of cleaning the tank, any dirt, sediment, or other material that is flushed off the internal surfaces of the apparatus, drains down the sloping bottom B of the tank to the sump 2, and then escapes from said sump through the draw-off pipe 4.

Figure 3:
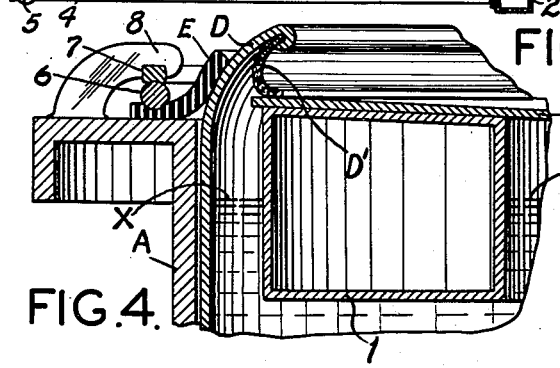
Figure 3 is an enlarged fragmentary sectional view, illustrating the auxiliary top seal on the side wall of the tank, and showing how said auxiliary top seal co-acts with the conventional side wall sealing means on the peripheral portion of the roof when the tank is full of liquid.

In the form of my invention herein shown the side wall A of the tank is provided at or adjacent its top edge with an auxiliary top seal E that is adapted to bear against or wipe on the primary side wall seal or shoe D of the floating roof, in the event the tank is filled with liquid to such a height or level that the side wall seal or shoe D projects upwardly some distance above the top edge of the tank side wall, or above the top edge of an annular extension attached to the side wall of a shallow tank, so as to increase the height of same. Said auxiliary top seal E forms the subject-matter of my divisional application Serial No. 297,800 filed October 14, 1939. Under such conditions, i. e., when the shoe D projects upwardly some distance above the top edge of the tank side wall, the height or depth of the narrow slot between the shoe D and the tank side wall is diminished, and consequently, the efficiency of the primary side wall seal is reduced, but there is no liability of gases escaping past the shoe D, because at such times the auxiliary top seal E presses against the outer surface of the shoe D. It will thus be seen that the auxiliary top seal E protects the primary side wall seal D, and in effect, increases the storage capacity of the tank, because it permits the roof C to float higher in the tank, without danger of gases or vapors escaping through the joint between the tank side wall and the side wall seal D mounted on the peripheral portion of the roof. Usually, the auxiliary top seal E will be formed by an annular-shaped member made of flexible gas-tight fabric, and it may be attached in any suitable way to the side wall A of the tank. It is herein illustrated as being secured to the tank side wall by a clamping ring 6 superimposed upon the outer edge portion of the top seal E, and retained in position by wedge-shaped retaining devices 7 that are wedged between the ring 6 and overhanging lugs 8 on the top edge of the side wall of the tank, as shown in Figure 3.

The apparatus herein illustrated differs from the conventional apparatus used to store crude oil, gasoline and other volatile vapors, in that it is equipped with an auxiliary "bottom" seal of novel construction that protects the joint between the tank side wall and the primary side wall seal carried by the roof, when the tank is empty, or when the quantity of liquid in the tank is not sufficient to float or seal the roof C. A number of desirable features or advantages result from constructing the apparatus in this way:

(1) A volatile liquid can be stored in the tank when the tank is substantially empty, without liability of exposing the liquid in the tank to the atmosphere, and without danger of gases or vapors escaping to the atmosphere, past the side wall seal D carried by the roof;

(2) Steam may be used successfully for cleaning the interior of the apparatus, because the space to which the steam is admitted is sufficiently tight to insure that the steam will be under sufficient pressure to effectively clean the apparatus;

(3) In cleaning the apparatus with steam, it is not necessary for workmen to enter the space between the floating roof and the bottom of the tank; and (4) The amount or quantity of steam required to clean the apparatus is not excessive or prohibitive.

The auxilary bottom seal that I prefer to use to protect the joint between the tank side wall and the primary side wall seal carried by the roof when the tank is empty, or substantially empty, is arranged adjacent the bottom of the tank and adjacent the side wall of the tank, and is so constructed that if an expansible medium, such, for example, as steam, be admitted to the space on the underside of the roof at such times, said steam will not escape upwardly around the peripheral edge of the roof. Said auxiliary bottom seal is so constructed and arranged that when it is not functioning, it will occupy one position or assume a certain position, and when it is engaged by the peripheral portion of the roof or the primary seal carried by the roof, said auxiliary bottom seal will flex, deform or move, due to the pressure exerted on same, and thus produce a gas-tight joint with the part of the structure that engages the same. Preferably, said auxiliary bottom seal is constructed from flexible gas-tight fabric, and it is mounted so that it will normally occupy an upright position and will move, usually in a downward direction, when engaged by the part of the structure with which it co-acts to produce a seal. Said auxiliary bottom seal may be supported by a horizontally-disposed flange or plate projecting inwardly from the side wall of the tank, adjacent the tank bottom. It may be supported by a vertically-disposed annular-shaped plate or ring that projects upwardly from the bottom of the tank adjacent the tank side wall, and which is disposed so that said auxiliary bottom seal will contact with the pontoon 1, or some other peripheral portion of the roof, when the roof is in its lowermost position; or it may be supported by an inwardly-projecting member on the tank side wall, or an upwardly-projecting member on the tank bottom that is disposed so that said auxiliary bottom seal will be contacted or engaged by the primary side wall seal carried by the roof, when the tank is empty or not filled with sufficient liquid to seal the roof.

Figure 4:
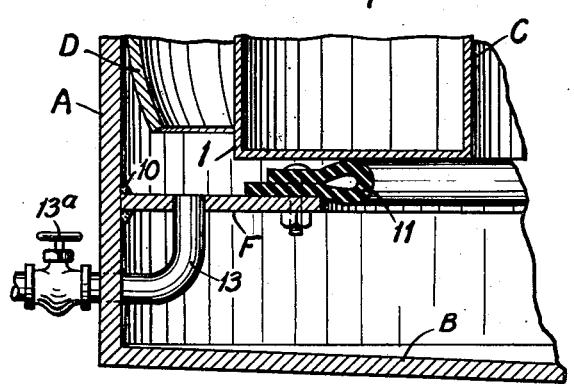
Figure 4 is a sectional view, illustrating one form of auxiliary bottom seal that may be used to protect the joint between the tank side wall and the side wall sealing means carried by the roof, when the tank is empty, or when the quantity of liquid in the tank is not sufficient to float or seal the roof.
Figure 6:
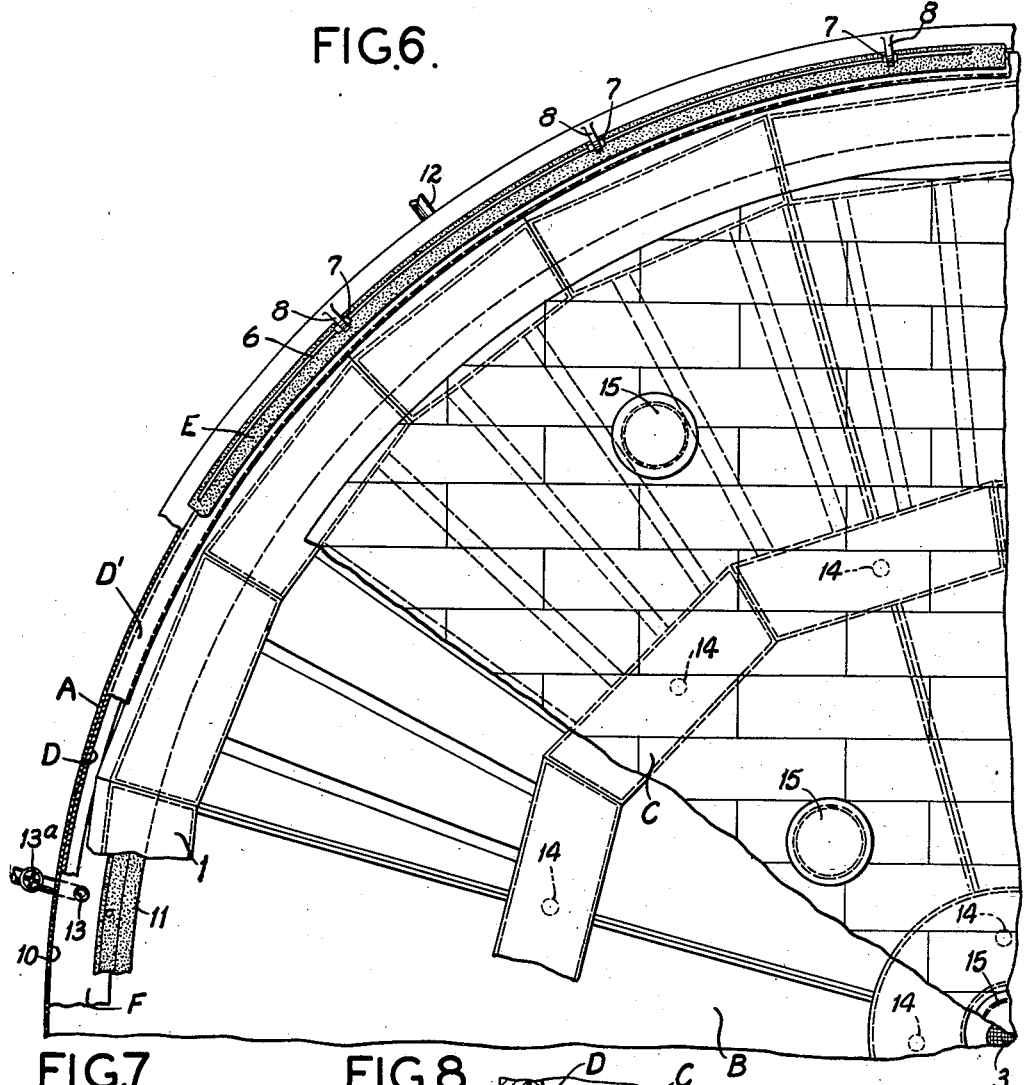
Figure 6 is an enlarged fragmentary top plan view of the apparatus, partly broken away, so as to more clearly illustrate the construction of the roof, the auxiliary top seal and the auxiliary bottom seal.

In Figure 4 of the drawings I have illustrated an auxiliary bottom seal as consisting of a compressible element 11 formed from a looped piece of flexible gas-tight fabric, supported by a horizontally-disposed plate or flange F, that projects inwardly from the tank side wall adjacent the bottom of the tank, said plate or flange F extending around the entire circumference of the tank side wall and having its outer edge connected to the tank side wall by a welded joint 10. When the tank is empty, or not filled with sufficient liquid to seal the roof, the pontoon 1, or some other peripheral portion of the roof, exerts sufficient pressure on the sealing element 11 to flex or change the shape of same and cause said element to co-act with said pontoon to produce a gas-tight joint, thereby making it possible to admit steam to the space on the underside of the roof, so as to effectively remove dirt, sediment, or volatile products that have collected on the underside of the roof, or on the bottom of the tank, and discharge said dislodged substances through the drain 4 leading from the sump 3 at the center of the bottom of the tank. When the pontoon or other peripheral portion moves upwardly out of engagement with the sealing element 11, said element, due to its inherent resiliency, will spring upwardly, or resume its normal shape or form. The steam or other medium used to clean the interior of the apparatus may be admitted in various ways to the space on the underside of the roof. Usually, the apparatus will comprise numerous steam supply pipes 12, provided with control valves 12ª, attached to the tank side wall at points below the horizontally-disposed plate or flange F that supports the auxiliary bottom seal, so as to enable steam to be introduced into the bottom portion of the tank at numerous points throughout its circumference. If desired, the apparatus may be constructed so that steam may also be used to effectively clean the side wall shoe D and the parts associated with same that constitute the primary side wall seal on the roof. Thus, as shown in Figure 4, additional steam supply pipes 13 equipped with control valves 13$^a$ may be led in through the tank side wall and attached to the horizontally-disposed plate or flange F, so as to terminate in the top face of said flange, whereby jets of steam may be discharged upwardly onto the primary side wall seal D carried by the roof, and relied upon to maintain a tight joint between the roof and the tank side wall when the roof is floating. Substances that collect on the top side of the horizontally-disposed plate or flange F can be easily removed from same by a flushing stream supplied by a hose that is inserted between the tank side wall and the shoe D carried by the roof when the roof is floating with the pontoon 1 positioned just a slight distance above the auxiliary bottom seal 11. Any suitable or preferred means may be used to sustain or support the weight of the roof and prevent the auxiliary bottom seal 11 from being crushed or permanently deformed when the roof is not floating on the liquid in the tank, such, for example, as upwardly-projecting supports on the bottom of the tank, or downwardly-projecting legs on the floating roof C. In the form of my invention herein illustrated the roof C is provided at numerous points throughout its area with depending legs 14 that are adapted to contact with the bottom of the tank, when the roof is in its lowermost position. The roof C is also preferably provided with one or more removable manhole covers 15, so as to provide access to the space on the underside of the roof, if it becomes necessary or desirable for workmen to enter the space on the underside of the roof.

Figures 7, 8:
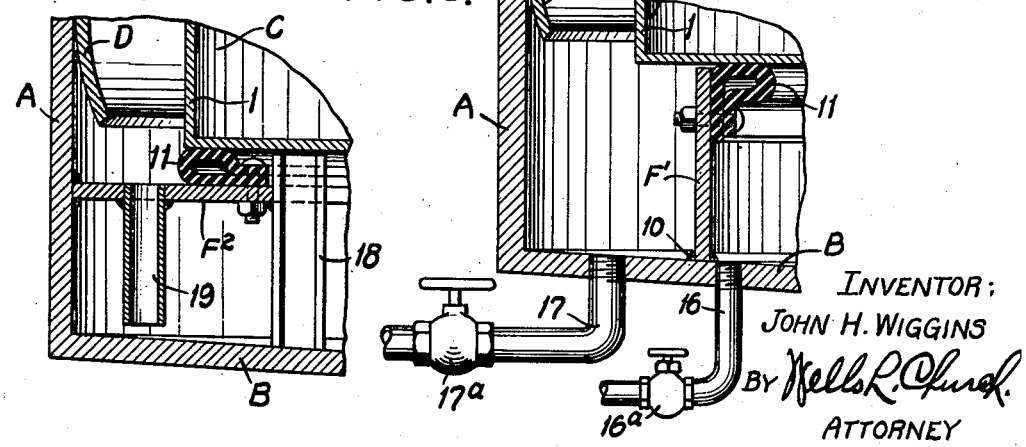
Figures 7 and 8 are sectional views, illustrating other forms of auxiliary bottom seals that may be used.

In Figure 8 of the drawings I have illustrated another means for supporting the auxiliary bottom seal 11, said means being formed by a vertically-disposed, annular-shaped plate or ring F' that projects upwardly from the bottom of the tank adjacent the tank side wall, and which is attached to the tank bottom by a welded joint 10. When the auxiliary bottom seal is supported or arranged in this manner, the steam or other medium used to clean the interior of the apparatus is admitted to the space on the underside of the roof, either through an opening or openings in the roof, or by means of supply pipes that are led inwardly through the side wall of the tank and attached to the vertically-disposed plate or member F', in such a way as to terminate on the inner surface of said member F', i. e., on the surface that is presented towards the center of the tank. This, of course, is necessary, because the ring-shaped plate or member F' is imperforate and is spaced inwardly some distance from the side wall of the tank, thus forming a trough that extends circumferentially around the tank and which is cut off from the space on the underside of the roof, when the pontoon 1 of the roof is contacting with the compressible element 11 that constitutes the auxiliary bottom seal. In order to make it clear that my broad idea contemplates admitting steam in any suitable way to the space on the underside of the roof, I have shown in Figure 8 how steam may be admitted by a supply pipe 16 attached to the bottom of the tank and provided with a control valve 16$^a$. When the apparatus is equipped with an auxiliary bottom seal 11 of the kind shown in Figure 8, the apparatus may comprise steam supply pipes similar to those designated by reference character 13 in Figure 4 for admitting steam to the annular trough between the vertically-disposed plate F' and the side wall of the tank, so as to dislodge matter that collects on or adheres to the primary side wall seal carried by the floating roof. Dislodged substances that collect in said trough may be easily removed from same through drain pipes 17 that lead from said trough, as shown in Figure 8.

In Figure 7 of the drawings I have illustrated another means for supporting the bottom seal 11, consisting of a horizontally-disposed flange or plate F$^2$, carried by the tank side wall, and having the sealing element 11 attached to the top side of same. A plurality of vertically-disposed supports or legs 18 are attached to the bottom of the tank adjacent the inner edge of said plate F$^2$, so as to constitute a supporting means that sustains the entire weight or load of the roof when the tank is empty, or substantially so. In order to facilitate the removal of dislodged substances that collect on the top side of the plate F$^2$, said plate may be provided at numerous points throughout its circumference with depending drains 19 through which dislodged particles of dirt or the like pass and eventually find their way to the sump 2 at the center of the bottom of the tank.

Figure 5:
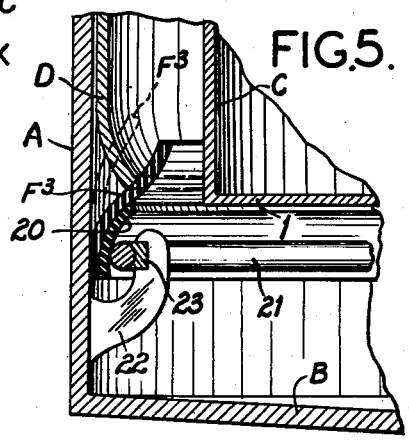
Figure 5 is a sectional view, illustrating another form of auxiliary bottom seal that may be used.

The several auxiliary bottom seals above described are designed so as to co-operate with a pontoon or some other peripheral portion of the roof to prevent an expansible medium on the underside of the roof from escaping through the joint between the tank side wall and the primary side wall seal carried by the roof, when the apparatus is being cleaned with steam. However, the auxiliary bottom seal of the apparatus may be constructed so as to co-operate directly with the primary side wall seal D carried by the roof to prevent steam from escaping at the peripheral edge of the roof, in the operation of cleaning the apparatus. Thus, as shown in Figure 5, the auxiliary bottom seal may consist of a flexible or pliable part carried by the tank side wall, or by the bottom of the tank, and arranged so that when the roof is in its lowermost position, said part is adapted to contact with or be engaged by the bottom edge of the primary side wall seal D carried by the roof, and placed under sufficient tension to produce a gas-tight joint with said primary seal D. Usually, when the auxiliary bottom seal is constructed in this way, it will be composed of a compressible or flexible element F$^3$ of fabric, attached to the tank side wall adjacent the bottom of the tank, as shown in Figure 5, and proportioned so that when the floating roof C moves downwardly into its lowermost position, the bottom edge of the shoe D on said roof will bear against said compressible element F$^3$, and force it downwardly and inwardly into the position shown in full lines in Figure 5, thus producing an effective seal between the tank side wall and the space on the underside of the roof. When the roof rises, said element will move upwardly or vertically, as shown in broken lines in Figure 5. It is immaterial how the element F$^3$ is mounted on or attached to the tank side wall, but one convenient way of constructing the apparatus is to clamp the element F³ between the tank side wall and a supporting member 20 that is held and normally disposed in a substantially upright position by a clamping ring 21 that is supported by lugs 22 on the tank side wall, and retained in position by wedges 23 that are driven between the lugs 22 and the ring 21. In installing the auxiliary bottom seal F³ care must be taken to attach the lugs 22 to the tank side wall at such points that when the roof moves downwardly to its extreme lowermost position, the side wall shoe D carried by the roof will be sure to bear tightly against the compressible element F³ and flex said element or place it under tension. As is well understood in this art, the conventional floating tank roof, whether it be of the pan type, or of the pontoon type, is provided at its outer edge or periphery with a portion that acts as a rim, which is partly submerged in the liquid on which the roof floats, thereby causing the liquid in the tank to seal the peripheral edge of the roof and prevent, or tend to prevent, gases on the underside of the roof from escaping at the edge of the roof. In the foregoing description of my invention, and in the claims, the expression "not filled with sufficient liquid to seal the roof," refers to the sealing of the peripheral portion or edge portion of the roof by the liquid in the tank. I have used this expression to make it clear that in my present invention the auxiliary bottom seal performs its function, both when the tank is empty, and when the peripheral portion of the roof is not contacted by sufficient liquid to seal the outer edge of the roof.

From the foregoing it will be understood that my invention, not only makes it commercially practicable to use steam to clean a liquid storage tank equipped with a floating roof, but it also greatly increases the range of usefulness of such apparatus, by providing a means which prevents air from circulating freely into and out of the tank when the tank contains some liquid, but not enough to cut off the flow of air around the peripheral edge of the roof. In other words, in the conventional apparatus not equipped with an auxiliary bottom seal of the kind above descirbed, when the amount of liquid in the tank is not sufficient to seal the pontoon at the peripheral edge of the roof, the evaporation loss is multiplied about twenty times over what it is when the tank contains sufficient liquid to float the roof. In my invention the bottom seal establishes the protective efficiency of the floating roof for a volumn of the tank which heretofore has been a dead loss as usable volume of the tank. In fact, it actually amounts to from approximately 6% to approximately 10% of the entire volume of the tank.

Having thus described my invention, what I claim as new and desire to secure by Letters Patent is:

A liquid storage apparatus, comprising a tank provided with an upright side wall, a floating roof that normally floats upon and is sustained by the liquid in the tank, a primary seal for the annular space between the side wall and the peripheral edge of the roof, comprising a relatively deep, annular-shaped side wall shoe mounted on the roof and arranged in sliding engagement with the tank side wall, the lower end of said shoe being submerged in the liquid in the tank when there is sufficient liquid in the tank to float or sustain the roof, a supporting means in the lower portion of the tank for sustaining the roof and maintaining it in spaced relation with the bottom of the tank when there is not sufficient liquid in the tank to float the roof, and an auxiliary bottom seal in the lower portion of the tank that comes into service and cuts off the escape of vapors upwardly through the space between the tank side wall and the annular shoe of the primary seal, when the roof rests upon or is carried by said supporting means, said auxiliary seal comprising a flexible or pliable element joined in a gas-tight manner to the tank side wall, throughout the entire circumference of the side wall and disposed so that when the roof comes to rest on said supporting means, a portion of the roof moves into gas-tight engagement with said flexible or pliable element.

JOHN H. WIGGINS.